April 11, 1944.   O. J. BRATZ   2,346,412
METHOD AND MEANS FOR HOLDING END LOOPS IN CABLES
Filed April 25, 1942
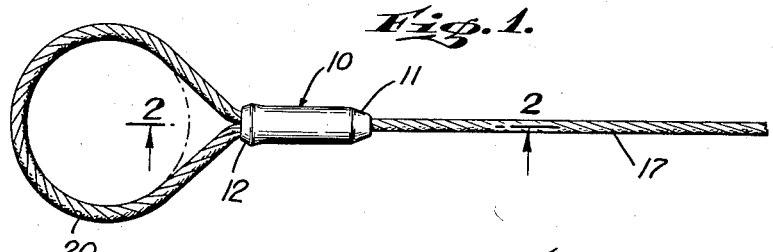
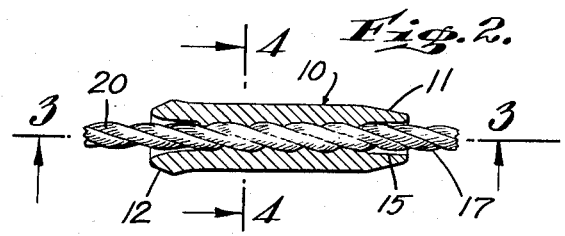
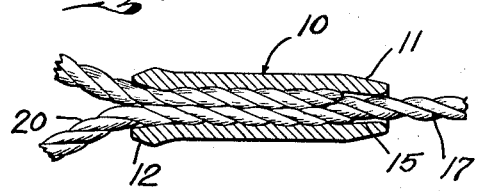
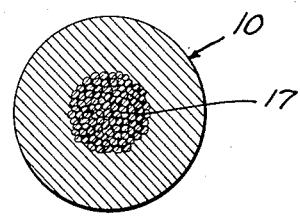
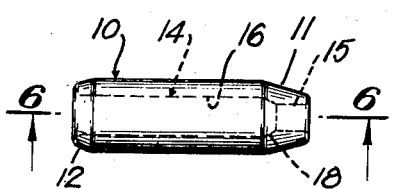
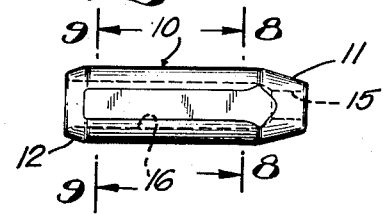
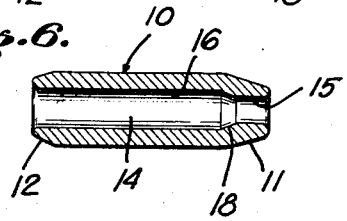
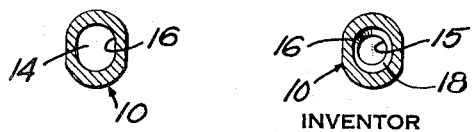
INVENTOR
OTTO J. BRATZ
BY
ATTORNEY

Patented Apr. 11, 1944

2,346,412

UNITED STATES PATENT OFFICE

2,346,412

METHOD AND MEANS FOR HOLDING END LOOPS IN CABLES

Otto J. Bratz, Adrian, Mich., assignor to American Chain & Cable Company, Inc., Bridgeport, Conn., a corporation of New York Application April 25, 1942, Serial No. 440,545

6 Claims. (Cl. 29—148)

This invention relates to a method and means for holding end loops formed in a cable.

It is old practice to form a loop in a cable by passing the end of the cable through a ferrule or sleeve, bending the section of the cable passed through the ferrule into a loop, passing the end of the cable through the ferrule in the opposite direction, and then swaging the ferrule upon the two courses of the cable.

In accordance with one known method a cylindrical ferrule is constricted and impacted upon the two courses of the cable. This construction is unsatisfactory as the various sections of the cable in the loop do not lie in one plane. The center of the loop lies to one side of the axis of the cable and the ferrule is not coaxial with the cable.

In accordance with another known method a flattened ferrule is constricted and pressed on the two courses of the cable by a press which shortens the longer diameter of the ferrule and causes the cable elements to embed slightly in the ferrule in the region of the ends of the longest diameter of the ferrule with substantially no distortion of the cable. The resultant connection is not strong enough to develop the full strength of the cable and the center of the loop and the axis of the ferrule lie to one side of the axis of the cable.

The main objects of this invention are the provisions of method and means for forming and holding end loops in cables with the centers of the loops lying on the projected axes of the ferrules and of the cables, the axes of the ferrules and cables coincident and lying in the planes of the loops, and the ferrules having the same required holding power.

Other objects of the invention will appear from the following description taken in connection with the drawing, in which—

Fig. 1 is a view of my improved ferrule and loop showing the loop extending in a horizontal plane;

Fig. 2 is a longitudinal diametral section on the line 2—2 of Fig. 1 showing the ferrule and the loop on a larger scale;

Fig. 3 is a longitudinal diametral section on the line 3—3 of Fig. 2;

Fig. 4 is a cross section on the line 4—4 of Fig. 2, showing the ferrule and compacted overlapped sections of the cable on a still larger scale;

Fig. 5 is a side view of my improved ferrule before it is flattened;

Fig. 6 is a longitudinal diametral section on the line 6—6 of Fig. 5;

Fig. 7 is a top view of the ferrule after the portion having the larger diameter bore is flattened;

Fig. 8 is a cross section on the line 8—8 of Fig. 7; and

Fig. 9 is a cross section on the line 9—9 of Fig. 7.

The ferrule disclosed in Fig. 5 and generally indicated at 10 is of substantially tubular form provided with a front long tapered end 11 and a rear short tapered end 12. The ferrule is provided with a through-bore 14 of two different diameters as indicated at 15 and 16. The smaller diameter section 15 of the bore is in the long tapered end 11 of the ferrule and extends inwardly to within a short distance of the base of the long tapered end 11 and is of a diameter just slightly larger than that of the cable 17. The section 16 of the bore extends throughout the length of the body of the ferrule and is of a diameter slightly less than twice that of the cable and is connected with the smaller diameter bore 15 by a conical bore 18.

As disclosed in Figs. 7, 8 and 9 the portion of the ferrule containing the larger diameter bore 16 is flattened and the bore 16 is of such diameter that it will after it has been given a generally elliptical cross section have sufficient cross sectional area and dimensions to freely receive two courses of the cable. During this flattening operation the long tapered end 11 will remain substantially circular in cross section and the smaller bore 15 within this end will also remain substantially circular in cross section.

After the ferrule has been flattened the end of the cable is inserted into the smaller diameter bore 15 in the long tapered end 11 of the ferrule and is then pushed through the ferrule a sufficient distance to provide a length of cable at the other end of the ferrule sufficient to form a loop 20 of the desired dimension. The loop 20 is then formed by bending the section of the cable passed through the ferrule and then the extreme end of this section of the cable is inserted into the larger elliptical bore 16 of the ferrule and pushed into the ferrule against the shoulder provided by the conical bore 18. The ferrule is then inserted into a swaging machine which may be of the rotary type and the main body of the ferrule is swaged into circular form, see Figs. 1 to 4, and is impacted upon the two courses of the cable within the ferrule leaving the end of the ferrule from which the two courses of cable emerge substantially unswaged. The diameter of two courses of cable in the impacted ferrule is slightly longer than that of the cable. The swaging operation is carried out in such a manner that the long tapered front end 11 of the ferrule will remain substantially unswaged and the rear short tapered end 12 will be made more nearly circular but its longer diameter will not be decreased sufficiently to squeeze the cable at the point where the two courses of cable enter the ferrule.

After the swaging operation has been performed the exterior and interior of the ferrule will be shaped as shown in Figs. 1, 2, 3, and 4, the metal of the ferrule having been flowed into the interstices of the cable in the region between the ends of the ferrule forming a strong connection between the cable and the ferrule. A certain amount of freedom of movement of the cable in the ends of the ferrule is permitted because the ends of the ferrule as shown in Figs. 2 and 3 remain substantially unswaged. As is apparent from Figs. 1, 2 and 3 by the use of the ferrule of my invention the center of the loop will always lie on the projected axis of the ferrule and of the cable.

It may now be understood that I have provided a method and means for holding a loop formed on the end of the cable by means of which it is assured that the holding power of the ferrule is the same in all cases and that the center of the loop so formed will always lie on the extended axis of the cable and the ferrule, that the construction is symmetrical in all respects and that the required free play between the ends of the fitting and the cable will be provided for in all cases.

While I have described method and means of forming and holding a loop which I regard as the preferred form, it is to be understood that this has been done for the purposes of illustration and that the method and means specifically described are not to be construed as limitative and accordingly I reserve the right to all such changes and modifications as fall within the principles of my invention and the scope of the appended claims.

I claim:

1. A ferrule consisting of a tubular sleeve provided with a bore of generally elliptical cross section of uniform diameters terminating at one end of the sleeve in a section of generally circular cross section of a diameter equal substantially to one-half of the longest diameter of said bore.

2. A ferrule consisting of a tubular sleeve having a body portion of generally elliptical cross section of uniform diameters and wall thickness and an end section of generally circular cross section, the bore in said end section being of a diameter equal substantially to one-half of the longest diameter of the bore in the main body portion.

3. A ferrule consisting of a tubular sleeve having a body portion of generally elliptical cross section of uniform diameters and wall thickness and an end section of generally circular cross section, the bore in said end section being of a diameter equal substantially to one-half of the longest diameter of the bore in the main body portion, said end section being tapered toward the end of the sleeve and said bore in said end section terminating at a point above the base of said tapered end section and said bores being connected by a tapered section terminating at a point adjacent the base of said tapered end section.

4. A ferrule consisting of a tubular sleeve having a body portion of generally elliptical cross section of uniform diameters and wall thickness and an end section of generally circular cross section, the bore in said end section being of a diameter equal substantially to one-half of the longest diameter of the bore in the main body portion, said end section being tapered toward the end of the sleeve and said bore in said end section terminating at a point above the base of said tapered end section and said bores being connected by a tapered section terminating at a point adjacent the base of said tapered section, and said sleeve being also provided at its other end with a tapered section of elliptical cross section having a bore constituting a projected continuation of the bore in the main body of the sleeve.

5. The method of forming and holding an end loop in a cable which consists in providing a ferrule in the form of a sleeve provided with a through-bore comprising sections of different diameters and cross sectional shapes, a shoulder between said sections of said bores, the smaller bore being located at one end of the ferrule and having a circular cross section of a diameter slightly larger than that of the cable and the larger section of the bore extending through the length of the body portion of the ferrule and being of elliptical cross section of the same diameters throughout its length and of a larger diameter slightly greater than twice the diameter of the cable, inserting the end of the cable into the bore of smaller diameter and pushing the end of the cable through the ferrule and beyond the end of the ferrule a distance to provide material for forming a loop, bending the end section of the cable into the form of a loop and the end of the cable against the body of the cable and inserting the end of the cable into the larger bore and pushing the same into the ferrule to a point limited by the shoulder between the bores of different diameters, and then swaging the body of the ferrule into circular form and impacting the same upon the two courses of cable until the two courses of cable together assume a circular cross sectional shape.

6. The method of forming and holding an end loop in a cable which consists in providing a ferrule in the form of a cylindrical sleeve having a cylindrical bore of larger diameter in the body of the sleeve and a cylindrical bore of smaller diameter in one end of the sleeve and a shoulder between said bores of different diameters, the smaller diameter bore having a diameter slightly larger than that of the cable and the larger bore having a diameter slightly smaller than twice the diameter of the cable but of sufficient length so that when flattened its larger diameter will be slightly longer than twice the diameter of the cable, flattening the body of the ferrule provided with the larger diameter bore to increase one of its diameters to a length slightly greater than twice the dimeter of the cable, inserting the end of the cable into the smaller cylindrical bore and pushing the end of the cable through the ferrule to an extent to provide cable material for forming a loop, bending the end section of the cable to form a loop and the end of the cable against the body of the cable and inserting the end of the cable into the bore of larger diameter and pushing the same into the ferrule to a point limited by said shoulder and then in swaging the flattened body portion of the ferrule into cylindrical form and impacting the same upon the two courses of cable until the two courses of cable assume a circular cross sectional shape.

OTTO J. BRATZ.